(12) United States Patent
Kuehn et al.

(10) Patent No.: US 10,550,867 B2
(45) Date of Patent: Feb. 4, 2020

(54) RAM AIR TURBINE STRUCTURES FOR TEMPERATURE DEPENDENT DAMPING

(71) Applicant: Hamilton Sundstrand Corporation, Charlotte, NC (US)

(72) Inventors: Daniel Kuehn, Roscoe, IL (US); Stephen Michael Bortoli, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 142 days.

(21) Appl. No.: 15/640,623

(22) Filed: Jul. 3, 2017

(65) Prior Publication Data
US 2019/0003498 A1  Jan. 3, 2019

(51) Int. Cl.
*F15B 21/045* (2019.01)
*F15B 15/22* (2006.01)
*F15B 15/14* (2006.01)
*B64D 41/00* (2006.01)

(52) U.S. Cl.
CPC ............ *F15B 15/22* (2013.01); *B64D 41/007* (2013.01); *F15B 15/149* (2013.01); *F15B 21/045* (2013.01)

(58) Field of Classification Search
CPC ....................................................... F15B 21/045
See application file for complete search history.

(56) References Cited

U.S. PATENT DOCUMENTS

| 2,534,791 | A | | 12/1950 | Moyer | |
|---|---|---|---|---|---|
| 3,687,160 | A | * | 8/1972 | Erickson | F15B 5/00 137/468 |
| 4,375,181 | A | * | 3/1983 | Conway | F15B 11/024 91/416 |
| 4,445,815 | A | | 5/1984 | Fortmann | |
| 4,735,056 | A | | 4/1988 | Goodman | |
| 2015/0337912 | A1 | * | 11/2015 | Randle | F16K 31/002 192/52.1 |

* cited by examiner

*Primary Examiner* — F Daniel Lopez

(74) *Attorney, Agent, or Firm* — Locke Lord LLP; Daniel J. Fiorello; Scott D. Wofsy

(57) ABSTRACT

A ram air turbine (RAT) actuator includes a housing and a piston in operable communication with the housing and at least one damping orifice in operable communication with the housing and the piston, a flow area of the at least one damping orifice being alterable to adjust damping of movement between the piston and the housing in response to changes in viscosity of a fluid related to temperature.

15 Claims, 2 Drawing Sheets

RAM AIR TURBINE STRUCTURES FOR TEMPERATURE DEPENDENT DAMPING

BACKGROUND

1. Field

The present disclosure relates to ram air turbines, more specifically to ram air turbine structures for temperature dependent damping.

2. Description of Related Art

The deployment of a ram air turbine (RAT) into the airstream is controlled by a RAT deployment actuator. This actuator is a stored energy device, that when a locking mechanism (uplock) is released the stored energy of a spring to pushes the RAT out of its storage bay in the aircraft and into the airstream. In order to control the impact at the end of the actuator stroke the actuator is filled with hydraulic fluid. This fluid is housed in a piston volume that is swept during deployment. The hydraulic fluid in this volume is forced through a series of damping/snubbing orifices. These damping orifices control and slow the rate of actuator extension at the end of the actuator's stroke. This reduces the impact forces at the end of the actuator stroke.

The RAT system has to supply power to the aircraft within a limited amount of time. Due to this time requirement the damping orifice cannot over restrict the deployment resulting in a deployment time exceeding the deployment time limit. However, if there is not enough damping the impact force will exceed the structural capability of the system. Therefore the damping of the system has to be tuned based on the impact force and deployment time limit.

The typical hydraulic fluid used in RAT deployment actuators is Skydrol. This fluid changes viscosity with temperature. Because of this change in viscosity the amount of energy required to push fluid through the damping orifices changes drastically. This results in RAT actuators that deploy quickly when the fluid is warm, but at a much slower rate when the fluid is cold. The constraints on the design of the damping orifices then become: 1) that the actuator must deploy quickly enough to meet the total RAT start-up time requirement when cold and 2) when hot the damping must be sufficient to ensure the impact load is below that of the structural capability of the system.

Such conventional methods and systems have generally been considered satisfactory for their intended purpose. However, there is still a need in the art for improved RAT structures. The present disclosure provides a solution for this need.

SUMMARY

A ram air turbine (RAT) actuator includes a housing and a piston in operable communication with the housing and at least one damping orifice in operable communication with the housing and the piston, a flow area of the at least one damping orifice being alterable to adjust damping of movement between the piston and the housing in response to changes in viscosity of a fluid related to temperature. The housing can define a housing cavity at least partially disposed within the housing cavity of the housing in a sealing relationship with the housing. The piston can define a piston cavity therein and can be configured to allow the housing to move axially relative to the piston between a deployed position and a stowed position wherein hydraulic fluid can flow between the housing cavity and the piston cavity. A plurality of damping orifices can be defined in the piston.

The actuator can include a damping orifice blocking device disposed around or within the piston and configured to allow or block flow through one or more of the damping orifices as a function of temperature. The damping orifice blocking device can be configured to allow flow through one or more of the damping orifices when within a first temperature range and to block the one or more damping orifices when within a second temperature range that is higher than the first temperature range.

The piston can be made from a first material and wherein the damping orifice blocking device is made of a second material different than the first material. The second material of the damping orifice blocking device can thermally expand faster than the first material of the piston. In certain embodiments, the damping orifice blocking device can be aluminum and the piston can made of steel.

The piston cavity can be configured to contain the damping orifice blocking device therein. The piston can include a retaining structure within the piston cavity to retain the damping orifice blocking device between the first and second temperature range. The damping orifice blocking device can be a ring or a bimetallic spring disposed within the retaining structure configured to expand radially to block the one or more damping orifices when within the second temperature range.

In certain embodiments, the damping orifice blocking device can include a sheath disposed within the piston cavity and fixed at one end relative to the piston such that the sheath can thermally expand axially relative to the piston to block the one or more damping orifices when within the second temperature range. The sheath can include a plurality of sheath holes corresponding to the one or more damping orifices such that the sheath holes align with the one or more damping orifices when within the first temperature range and the sheath thermally expands to block the one or more damping orifices when within the second temperature range.

The piston can be configured to be fixed to an aircraft and the housing is configured to be moved relative to the piston. Any suitable configuration is contemplated herein.

In accordance with at least one aspect of this disclosure, a method for controlled damping of an actuator over a temperature range comprises modifying a damping orifice flow area of at least one damping orifice within the actuator as a function of temperature to counteract viscosity changes of a damping fluid related to temperature changes. Modifying the damping orifice flow area can include allowing flow through one or more damping orifices of a piston when within a first temperature range and blocking the one or more damping orifices when within a second temperature range that is higher than the first temperature range.

In certain embodiments, blocking the one or more damping orifices when within a second temperature range includes radially expanding a damping orifice blocking device within the piston to block the one or more damping orifices. In certain embodiments blocking the one or more damping orifices when within a second temperature range can include axially expanding a damping orifice blocking device within the piston to block the one or more damping orifices.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
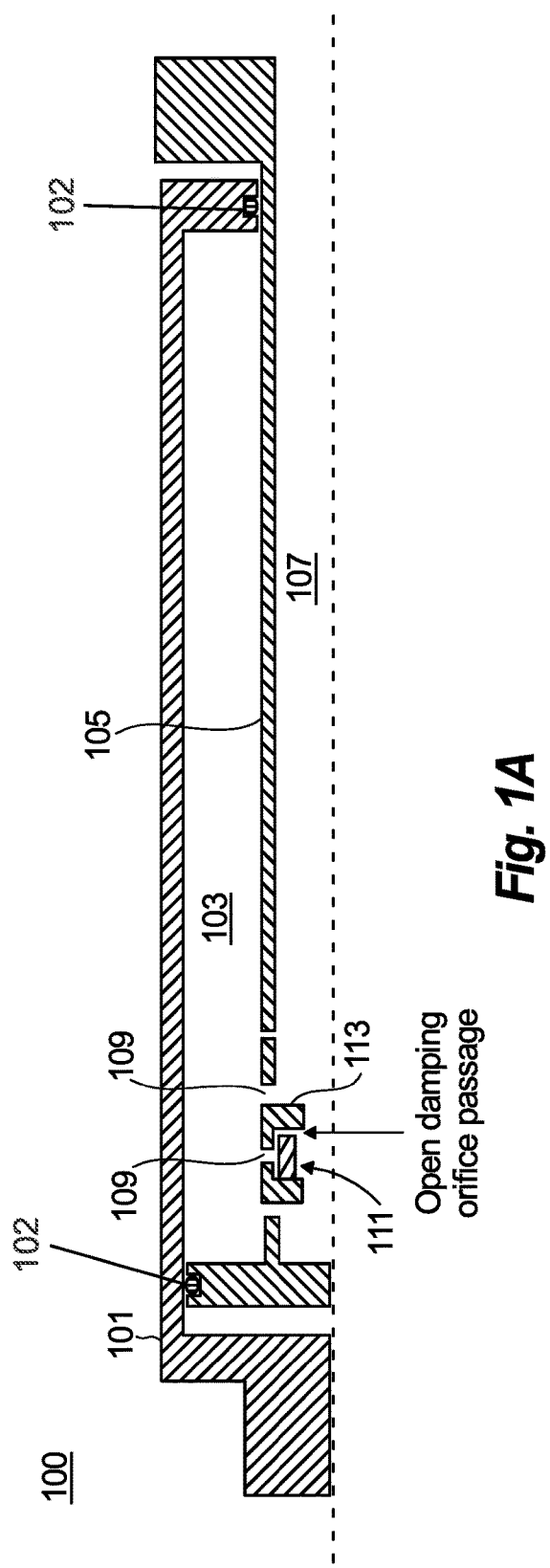
FIG. 1A is a partial cross-sectional view of an embodiment of an actuator (e.g., for a ram air turbine) in accordance with this disclosure, show within a first temperature range and/or an extreme thereof.

Reference will now be made to the drawings wherein like reference numerals identify similar structural features or aspects of the subject disclosure. For purposes of explanation and illustration, and not limitation, an illustrative view of an embodiment of an actuator in accordance with the disclosure is shown in FIG. 1A and is designated generally by reference character 100. Other embodiments and/or aspects of this disclosure are shown in FIGS. 1B-2B. The systems and methods described herein can be used to control actuator deployment speed across a range of temperatures (e.g., for ram air turbines).

Figure 1B:
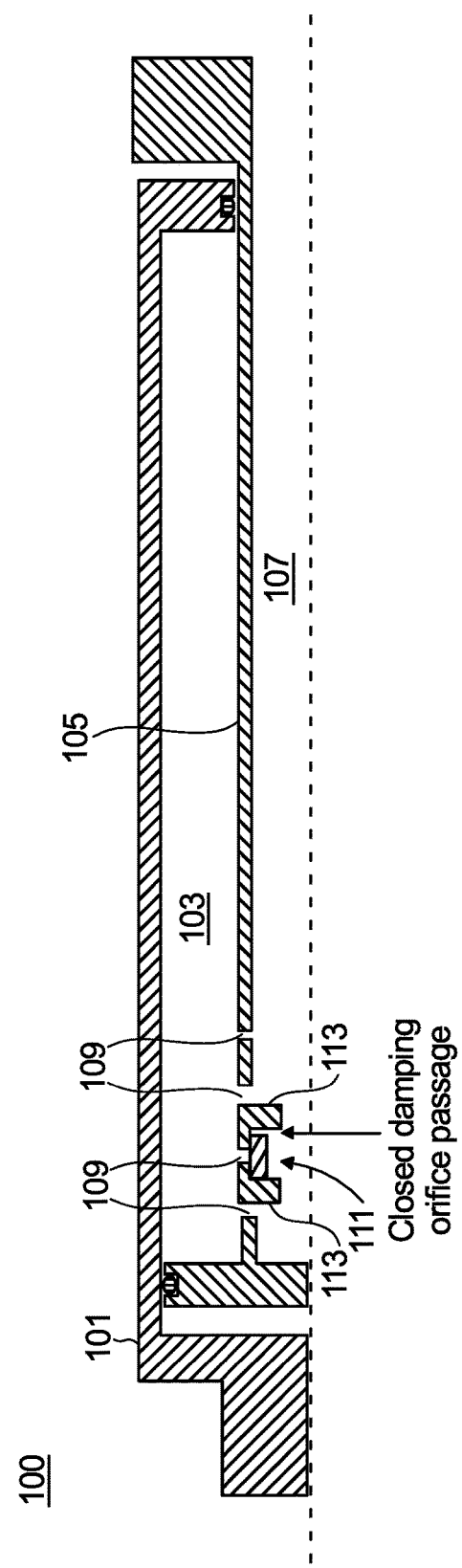
FIG. 1B is a partial cross-sectional view of the embodiment of FIG. 1A, shown within a second temperature range and/or an extreme thereof.

A ram air turbine (RAT) actuator includes a housing and a piston in operable communication with the housing and at least one damping orifice in operable communication with the housing and the piston, a flow area of the at least one damping orifice being alterable to adjust damping of movement between the piston and the housing counteract changes in viscosity of a fluid related to temperature. Referring to FIGS. 1A and 1B, a ram air turbine (RAT) actuator 100 can include a housing 101 defining a housing cavity 103 and a piston 105 at least partially disposed within the housing cavity 103 of the housing 101 in a sealing relationship (e.g., via one or more seals 102 as shown that interact between the housing 101 and the piston 105) relative to the housing 101. The housing 101 and cavity 103 can include any suitable shape (e.g., cylindrical). The piston 105 defines a piston cavity 107 therein and is configured to allow the housing 101 to move axially (e.g., right to left as shown) relative to the piston 105 between a deployed position (e.g., the housing 101 is moved left relative to the piston 105 as shown) and a stowed position (e.g., in the position as shown in FIGS. 1A-2B).

While movement is described herein, the piston and housing movement are relative to each other in any suitable manner. For example, the piston 105 can be fixed to an aircraft structure and housing 101 can be attached to a RAT and moveable relative to the aircraft structure. The reverse can be true as well.

A plurality of damping orifices 109 is defined in the piston 105. Hydraulic fluid can flow between the housing cavity 103 and the piston cavity 107 through the damping orifices 109 to allow actuation between the deployed position and the stowed position.

The actuator 100 includes a damping orifice blocking device 111 disposed around or within the piston 105 and configured to allow or block flow through one or more of the damping orifices 109 as a function of temperature. The damping orifice blocking device 111 can be configured to allow flow through one or more of the damping orifices 109 when within a first temperature range (e.g., as shown in FIG. 1A) and to block the one or more damping orifices 109 when within a second temperature range (e.g., as shown in FIG. 1B) that is higher than the first temperature range.

The piston 105 can be made from a first material and the damping orifice blocking device 111 can be made of a second material different than the first material. In certain embodiments, the second material of the damping orifice blocking device 111 can thermally expand faster than the first material of the piston 105. In certain embodiments, the damping orifice blocking device 111 can be aluminum and the piston 105 can made of steel. It is contemplated that the reverse can be true, and the damping orifice blocking device 111 can be disposed outside of the piston 105 and can be configured to shrink relative to the piston 105 with an increase of temperature to thereby block one or more of the damping orifices 109 when within the second temperature range.

As shown, the piston cavity 107 can be configured to contain the damping orifice blocking device 111 therein. The piston 105 can include a retaining structure 113 within the piston cavity 107 configured to retain (e.g., axially in FIGS. 1A and 1B, radially in FIGS. 2A and 2B) the damping orifice blocking device 111 between the first and second temperature range. As shown, the damping orifice blocking device 111 can be a ring or a bimetallic spring disposed within the retaining structure 113 and can be configured to expand radially to block the one or more damping orifices 109 when within the second temperature range. The retaining structure 113 can include any suitable structure (e.g., inner flanges configured to fit a ring as shown in FIGS. 1A and 1B).

Figure 2A:
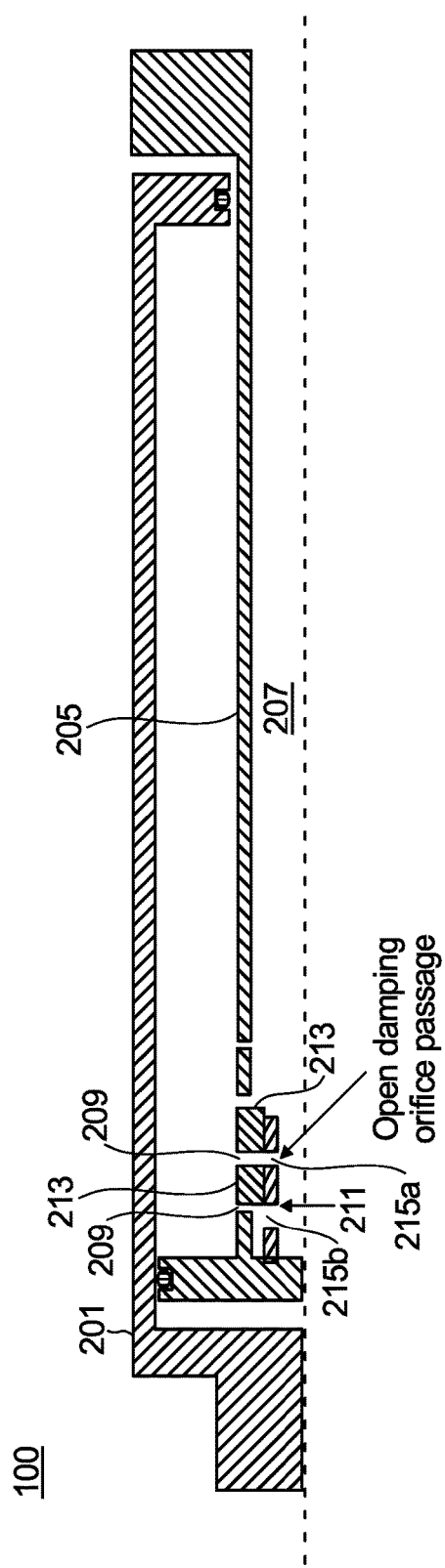
FIG. 2A is a partial cross-sectional view of an embodiment of an actuator (e.g., for a ram air turbine) in accordance with this disclosure, showing within the first temperature range and/or an extreme thereof.
Figure 2B:
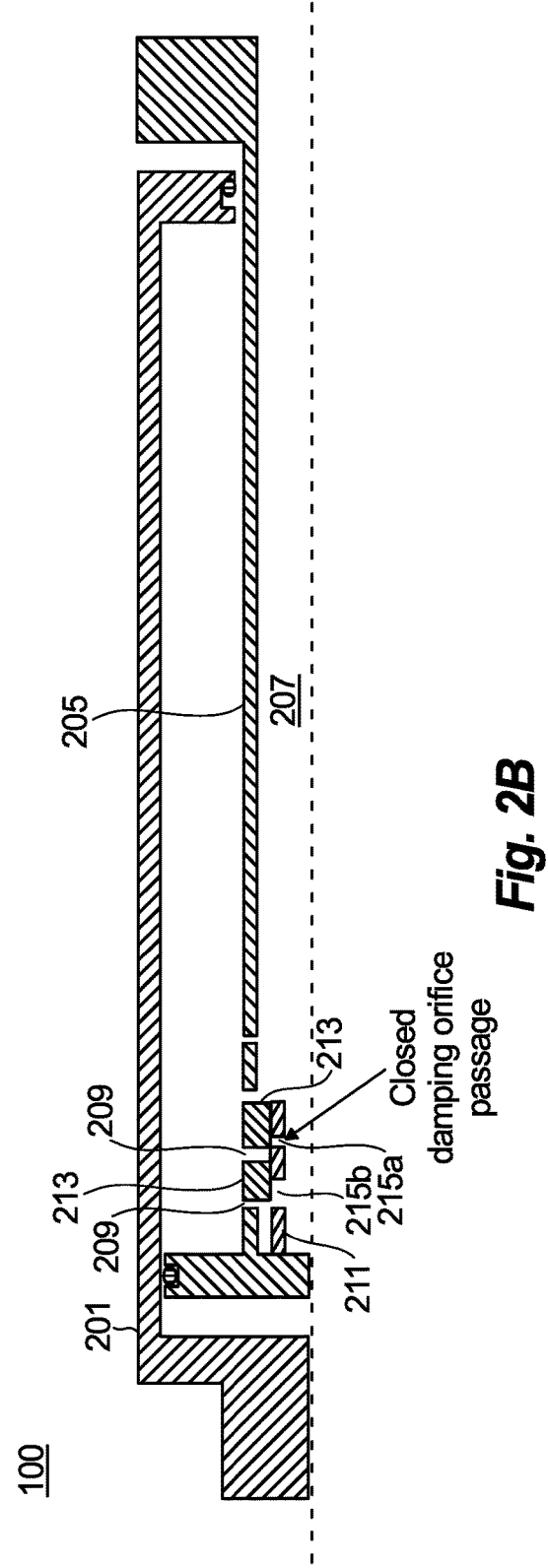
FIG. 2B is a partial cross-sectional view of the embodiment of FIG. 2A, shown when within the second temperature range and/or an extreme thereof.

In certain embodiments, referring additionally to FIGS. 2A and 2B the damping orifice blocking device 211 can include a sheath disposed within the piston cavity 207 and fixed at one end relative to the piston 205 such that the sheath can thermally expand axially relative to the piston 205 to block the one or more damping orifices 209 when within the second temperature range. The sheath can include a plurality of sheath holes 215a, 215b corresponding to the one or more damping orifices 209 such that one or more of the sheath holes 215a, 215b align with the one or more damping orifices 209 when within the first temperature range (e.g., as shown in FIG. 2A) and the sheath thermally expands to block the one or more damping orifices 209 when within the second temperature range (e.g., as shown in FIG. 2B). As shown, the one or more sheath holes 215b can be sized to allow fluid communication between one or more damping orifices 209 at both the first and second temperature range, while at least one sheath hole 215a is configured to block one or more damping orifices 209 when within the second temperature range. It is contemplated the device 211 can be configured for similar use outside the piston 205 in any suitable manner.

In certain embodiments, the sheath can be mounted to the inside of the piston 205 on a proximal end (e.g., left as shown) in any suitable manner (e.g., threading, rotational pin locking to prevent rotation of sheath) and can be any suitable length in the piston cavity 207 (e.g., shorter than the distance of the last damping hole 209, for example). However, any suitable arrangement is contemplated herein. For example, the sheath of the damping orifice blocking device 211 can be mounted to the opposite end of the piston 205 and can be much longer to reach beneath the damping orifices 209. In such an embodiment, the longer the sheath, the more significant the axial thermal expansion or contraction is relative to the piston 205.

In accordance with at least one aspect of this disclosure, a method for controlled damping of an actuator over a temperature range comprises modifying damping orifice flow area within the actuator as a function of temperature to account for viscosity changes with temperature changes. Modifying the damping orifice flow area can include allowing flow through one or more damping orifices of a piston when within a first temperature range and blocking the one or more damping orifices when within a second temperature range that is higher than the first temperature range.

In certain embodiments, blocking the one or more damping orifices when within a second temperature range includes radially expanding a damping orifice blocking device within the piston to block the one or more damping orifices. In certain embodiments can include blocking the one or more damping orifices when within a second temperature range includes axially expanding a damping orifice blocking device within the piston to block the one or more damping orifices.

Traditional actuators for RATs are designed for meeting deployment time requirements at the coldest operational temperature and for meeting force load requirements at the warmest operational temperature. Embodiments of this disclosure solve this issue. For example, certain blocking devices within pistons can expand faster than pistons, so in a warm temperature, embodiments close damping orifices which reduces flow area for the hydraulic fluid and reduces maximum force experienced without sacrificing speed at a cold temperature.

Accordingly, embodiments cause a portion of the damping orifices to be partially or fully closed when the hydraulic fluid is warm so that the combined damping orifice area is reduced. At cold temperatures these orifices can be open such that the combined damping orifice area is increased. Using proper sizing, embodiments can compensate for the change in viscosity of the hydraulic fluid. As described above, in certain embodiments, the mechanism of the orifices opening and closing at different temperatures can be accomplished through the use of two different materials that have different thermal coefficients of expansion. Embodiments allow for more consistent deployment times across the RAT operating temperature range, and as a result of this more consistent deployment time, the average deployment time could be slowed which would lead to a lower impact force at the end of RAT deployment. This reduces the mass of the actuator and/or allows lower cost of materials and/or materials processing.

The methods and systems of the present disclosure, as described above and shown in the drawings, provide for actuators (e.g., for RATs) with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A ram air turbine (RAT) actuator, comprising:
a housing;
a piston in operable communication with the housing; and
at least one damping orifice in operable communication with the housing and the piston, a flow area of the at least one damping orifice being alterable to adjust damping of movement between the piston and the housing to counteract changes in viscosity of a fluid related to temperature;
wherein the piston is at least partially disposed within the housing cavity of the housing in a sealing relationship with the housing,
wherein the piston defines a piston cavity therein and is configured to allow the housing to move axially relative to the piston between a deployed position and a stowed position, wherein the at least one damping orifice includes a plurality of damping orifices defined in the piston,
wherein hydraulic fluid can flow between the housing cavity and the piston cavity through the plurality of damping orifices,
wherein the actuator includes a damping orifice blocking device disposed around or within the piston and configured to allow or block flow through one or more of the damping orifices as a function of temperature, and
wherein the damping orifice blocking device is configured to allow flow through one or more of the damping orifices when within a first temperature range and to block the one or more damping orifices when within a second temperature range that is higher than the first temperature range.

2. The actuator of claim 1, wherein the piston is made from a first material and wherein the damping orifice blocking device is made of a second material different than the first material.

3. The actuator of claim 2, wherein the second material of the damping orifice blocking device thermally expands faster than the first material of the piston.

4. The actuator of claim 3, wherein the damping orifice blocking device is aluminum and the piston is made of steel.

5. The actuator of claim 1, wherein the piston cavity is configured to contain the damping orifice blocking device therein.

6. The actuator of claim 5, wherein the piston includes a retaining structure within the piston cavity to retain the damping orifice blocking device between the first and second temperature range.

7. The actuator of claim 6, wherein the damping orifice blocking device is a ring or a bimetallic spring disposed within the retaining structure configured to expand radially to block the one or more damping orifices when within the second temperature range.

8. The actuator of claim 5, wherein the damping orifice blocking device includes a sheath disposed within the piston cavity and fixed at one end relative to the piston such that the sheath can thermally expand axially relative to the piston to block the one or more damping orifices when within the second temperature range.

9. The actuator of claim 8, wherein the sheath includes a plurality of sheath holes corresponding to the one or more damping orifices such that the sheath holes align with the one or more damping orifices when within the first temperature range and the sheath thermally expands to block the one or more damping orifices when within the second temperature range.

10. The actuator of claim 1, wherein the piston is configured to be fixed to an aircraft.

11. A method for controlled damping of an actuator over a temperature range, comprising:
modifying a damping orifice flow area of one or more damping orifices within the actuator as a function of temperature to counteract viscosity changes of a damping fluid related to temperature changes, wherein the one or more damping orifices are defined in a piston of the actuator that is in operable communication with a housing of the actuator, wherein modifying the damping orifice flow area includes allowing flow through the one or more damping orifices when within a first temperature range and blocking the one or more damping orifices when within a second temperature range that is higher than the first temperature range.

12. The method of claim 11, wherein blocking the one or more damping orifices when within a second temperature range includes radially expanding a damping orifice blocking device within the piston to block the one or more damping orifices.

13. The method of claim 11, wherein blocking the one or more damping orifices when within a second temperature range includes axially expanding a damping orifice blocking device within the piston to block the one or more damping orifices.

14. A ram air turbine (RAT) actuator, comprising:
a housing;
a piston in operable communication with the housing; and
at least one damping orifice in operable communication with the housing and the piston, a flow area of the at least one damping orifice being alterable to adjust damping of movement between the piston and the housing to counteract changes in viscosity of a fluid related to temperature;
wherein the piston is at least partially disposed within the housing cavity of the housing in a sealing relationship with the housing,
wherein the piston defines a piston cavity therein and is configured to allow the housing to move axially relative to the piston between a deployed position and a stowed position, wherein the at least one damping orifice includes a plurality of damping orifices defined in the piston,
wherein hydraulic fluid can flow between the housing cavity and the piston cavity through the plurality of damping orifices,
wherein the actuator includes a damping orifice blocking device disposed around or within the piston and configured to allow or block flow through one or more of the damping orifices as a function of temperature, and
wherein the piston is configured to be fixed to an aircraft.

15. A ram air turbine (RAT) actuator, comprising:
a housing;
a piston in operable communication with the housing;
at least one damping orifice in operable communication with the housing and the piston, a flow area of the at least one damping orifice being alterable to adjust damping of movement between the piston and the housing to counteract changes in viscosity of a fluid related to temperature; and
a damping orifice blocking device configured to allow flow through one or more of the damping orifices when within a first temperature range and to block the one or more damping orifices when within a second temperature range that is higher than the first temperature range.

* * * * *